United States Patent
Lee et al.

(10) Patent No.: US 11,178,665 B2
(45) Date of Patent: Nov. 16, 2021

(54) METHOD FOR PERFORMING NON-ORTHOGONAL MULTIPLE ACCESS SCHEME-BASED COMMUNICATION, AND DEVICE THEREFOR

(71) Applicant: LG Electronics Inc., Seoul (KR)

(72) Inventors: Hojae Lee, Seoul (KR); Sangrim Lee, Seoul (KR); Dongkyu Kim, Seoul (KR); Myeongjin Kim, Seoul (KR); Kwangseok Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 257 days.

(21) Appl. No.: 16/491,013

(22) PCT Filed: Mar. 7, 2017

(86) PCT No.: PCT/KR2017/002444
§ 371 (c)(1),
(2) Date: Sep. 4, 2019

(87) PCT Pub. No.: WO2018/164292
PCT Pub. Date: Sep. 13, 2018

(65) Prior Publication Data
US 2020/0015218 A1    Jan. 9, 2020

(51) Int. Cl.
*H04W 72/04* (2009.01)
*H04W 72/12* (2009.01)
*H04L 29/08* (2006.01)

(52) U.S. Cl.
CPC ....... *H04W 72/048* (2013.01); *H04W 72/042* (2013.01); *H04W 72/0413* (2013.01);
(Continued)

(58) Field of Classification Search
None
See application file for complete search history.

(56) References Cited

U.S. PATENT DOCUMENTS

| | | | |
|---|---|---|---|
| 2012/0051319 A1* | 3/2012 | Kwon | H04W 72/0406 370/329 |
| 2015/0208366 A1* | 7/2015 | Papasakellariou | H04W 52/0212 370/311 |

(Continued)

FOREIGN PATENT DOCUMENTS

| | | |
|---|---|---|
| KR | 10-2014-0125643 A | 10/2014 |
| WO | 2016/178477 A1 | 11/2016 |
| WO | 2017/018620 A1 | 2/2017 |

OTHER PUBLICATIONS

Intel Corporation: "DM-RS design and channel estimation for UL NOMA", R1-1609501, 3GPP TSG RAN WG1 Meeting #86bis, Lisbon, Portugal, Oct. 10-14, 2016.

*Primary Examiner* — Christopher T Wyllie
(74) *Attorney, Agent, or Firm* — Dentons US LLP

(57) ABSTRACT

A method for performing non-orthogonal multiple access (NOMA) scheme-based communication by a base station may comprise the steps of: determining at least one transmission data resource group on the basis of a scheduling request (SR) reception reliability; transmitting information on the determined at least one data resource group to a terminal; and receiving uplink data from the terminal via a predefined uplink data transmission area in the at least one data resource group, wherein the at least one data resource group and an SR resource group including an SR transmission area, in which an SR can be transmitted, are overlappingly allocated in a physical resource area, and the predefined uplink data transmission area within the at least one data resource group and the SR transmission area of the SR resource group overlap each other in the physical resource area.

15 Claims, 11 Drawing Sheets

(52) U.S. Cl.
 CPC ..... *H04W 72/121* (2013.01); *H04W 72/1284* (2013.01); *H04L 67/12* (2013.01)

(56) References Cited

U.S. PATENT DOCUMENTS

| | | |
|---|---|---|
| 2015/0245320 A1 | 8/2015 | Chen et al. |
| 2018/0302917 A1* | 10/2018 | John Wilson ....... H04W 74/004 |
| 2019/0014593 A1* | 1/2019 | Park .................. H04W 72/1226 |
| 2019/0166614 A1* | 5/2019 | Byun .................... H04L 1/0013 |
| 2020/0015218 A1* | 1/2020 | Lee ....................... H04L 5/0044 |

* cited by examiner

Block Interpolation    Linear Interpolation    Non-liner Interpolation

METHOD FOR PERFORMING NON-ORTHOGONAL MULTIPLE ACCESS SCHEME-BASED COMMUNICATION, AND DEVICE THEREFOR

This application is a National Stage Entry of International Application No. PCT/KR2017/002444 filed Mar. 7, 2017, which is hereby incorporated by reference in their entirety for all purposes as if fully set forth herein.

TECHNICAL FIELD

The present invention relates to wireless communications, and more particularly, to a method for performing non-orthogonal multiple access scheme-based communication, and a device therefor.

BACKGROUND ART

In the next generation 5G system, Wireless Sensor Network (WSN) and Massive Machine Type Communication (MTC) for intermittently transmitting small packets targeting massive connection/low cost/low power services are considered.

Massive MTC services have very limited connection density requirements, while having very flexible data rate and end-to-end (E2E) latency requirements (e.g., connection density of up to 200,000/$km^2$, E2E latency ranging from several seconds to several hours, and DL/UL data rate typically ranging from 1 to 100 kbps).

DISCLOSURE

Technical Problem

An object of the present invention is to provide a method for performing non-orthogonal multiple access scheme-based communication by a base station.

Another object of the present invention is to provide a method for performing non-orthogonal multiple access scheme-based communication by a user equipment.

Another object of the present invention is to provide a base station for performing non-orthogonal multiple access scheme-based communication.

Another object of the present invention is to provide a user equipment for performing non-orthogonal multiple access scheme-based communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In another aspect of the present invention, provided herein is a method for performing Non-Orthogonal Multiple Access (NOMA)-based communication by a base station, the method including determining at least one transmission data resource group based on scheduling request (SR) reception reliability, transmitting information about the determined at least one data resource group to a terminal, and receiving uplink data from the terminal through a predefined uplink data transmission region in the at least one data resource group, wherein the at least one data resource group and an SR resource group including an SR transmission region are allocated to a physical resource region in an overlapping manner, the SR transmission region allowing transmission of an SR therein, wherein the predefined uplink data transmission region in the at least one data resource group and the SR transmission region of the SR resource group overlap with each other in the physical resource region.

The predefined uplink data transmission region in the at least one data resource group may be a contention-based data transmission region. The information about the determined at least one data resource group may be either terminal-group-specific downlink control information or terminal-common downlink control information. The base station may further receive, from the terminal, the SR through the SR resource group together with the uplink data.

The SR reception reliability may be determined by a detection error rate of the SR in the SR resource group or may be determined by an ACK ratio in the at least one data resource group.

The base station may determine the number of the at least one data resource group or designate the at least one data resource group, based on the SR reception reliability.

In another aspect of the present invention, provided herein is a method for performing Non-Orthogonal Multiple Access (NOMA)-based communication by a terminal, the method including receiving, from a base station, information about at least one data resource group determined based on scheduling request (SR) reception reliability, and transmitting uplink data to the base station through a predefined uplink data transmission region in the at least one data resource group, wherein the at least one data resource group and an SR resource group including an SR transmission region are allocated to a physical resource region in an overlapping manner, the SR transmission region allowing transmission of an SR therein, wherein the predefined uplink data transmission region in the at least one data resource group and the SR transmission region of the SR resource group overlap with each other in the physical resource region.

The terminal may further transmit, to the base station, the SR through the SR resource group together with the uplink data. When the at least one data resource group includes a plurality of data resource groups, a data resource group having higher reception reliability may be selected from among the plurality of data resource groups, and the uplink data may be transmitted through the predefined uplink data region in the selected data resource group.

In another aspect of the present invention, provided herein is a base station for performing Non-Orthogonal Multiple Access (NOMA)-based communication, the base station including a processor configured to determine at least one transmission data resource group based on scheduling request (SR) reception reliability, a transmitter configured to transmit information about the determined at least one data resource group to a terminal, and a receiver configured to receive uplink data from the terminal through a predefined uplink data transmission region in the at least one data resource group, wherein the at least one data resource group and an SR resource group including an SR transmission region are allocated to a physical resource region in an overlapping manner, the SR transmission region allowing transmission of an SR therein, wherein the predefined uplink data transmission region in the at least one data resource group and the SR transmission region of the SR resource group overlap with each other in the physical resource region.

The receiver may be further configured to receive, from the terminal, the SR through the SR resource group together with the uplink data. The processor may be configured to determine the number of the at least one data resource group or designate the at least one data resource group, based on the SR reception reliability.

In another aspect of the present invention, provided herein is a terminal for performing Non-Orthogonal Multiple Access (NOMA)-based communication, the terminal including a receiver configured to receive, from a base station, information about at least one data resource group determined based on scheduling request (SR) reception reliability, and a transmitter configured to transmit uplink data to the base station through a predefined uplink data transmission region in the at least one data resource group, wherein the at least one data resource group and an SR resource group including an SR transmission region are allocated to a physical resource region in an overlapping manner, the SR transmission region allowing transmission of an SR therein, wherein the predefined uplink data transmission region in the at least one data resource group and the SR transmission region of the SR resource group overlap with each other in the physical resource region.

The transmitter may be further configured to transmit the SR through the SR resource group together with the uplink data.

Advantageous Effects

According to an embodiment of the present invention, by varying reliability among the respective PoMA-based resource groups, an SR and uplink data may be efficiently transmitted without interference.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

BEST MODE

Figure 1:
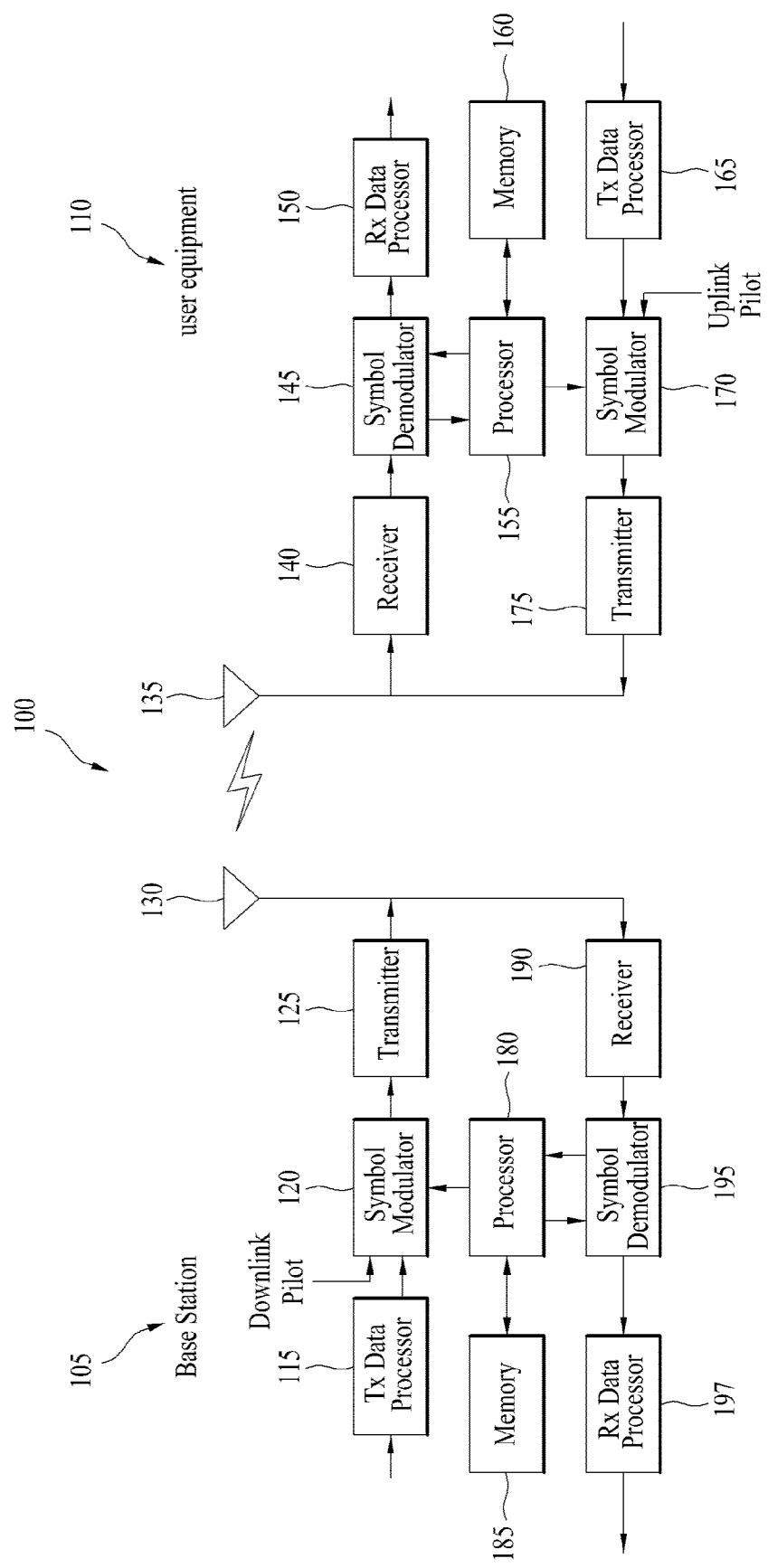
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, it is assumed that the term terminal is a common name of mobile or fixed user stage devices such as a user equipment (UE), a mobile station (MS), an advanced mobile station (AMS) and the like. It is also assumed that the term base station (BS) is a common name of any nodes at a network stage communicating with a terminal, such as a Node B (NB), an eNode B (eNB), an access point (AP) and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as application specific integrated circuits (ASICs), digital signal processors (DSPs), digital signal processing devices (DSPDs), programmable logic devices (PLDs), field programmable gate arrays (FPGAs), and the like.

In case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

In the present invention, techniques for user (or UE) grouping and reference signal (RS) hopping based on a Non-orthogonal Multiple Access (NMA) scheme for supporting massive connectivity are proposed.

Figure 2:
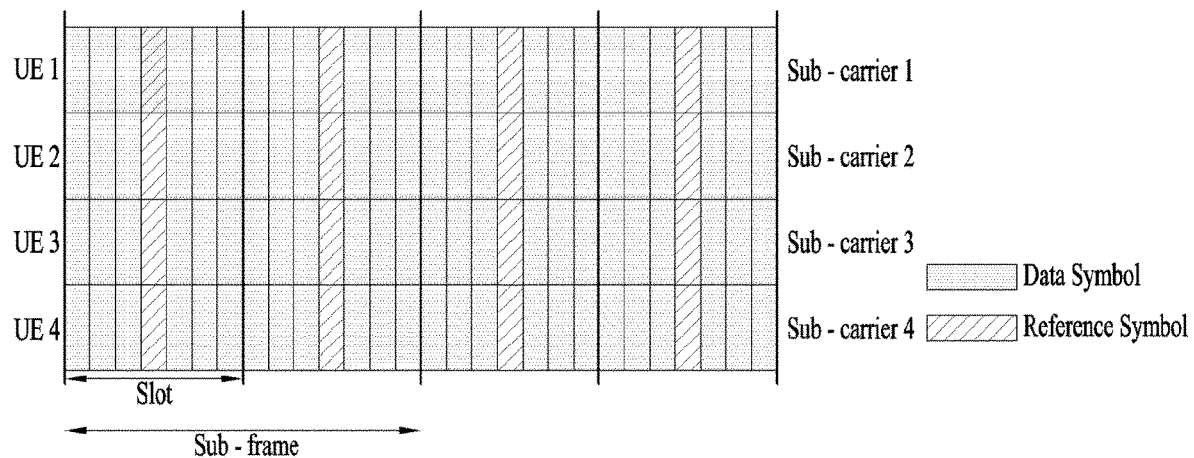
FIG. 2 is a diagram showing a frame structure used for uplink support in a Long Term Evolution (LTE)/LTE-A system.

FIG. 2 is a diagram showing a frame structure used for uplink support in a Long Term Evolution (LTE)/LTE-A system.

In FIG. 2, data symbols may be configured for a physical uplink shared channel (PUSCH) or a physical uplink control channel (PUCCH), and reference symbols may be configured for a DMRS. The frame structure of FIG. 2 may be varied according to the environment of the wireless communication system. That is, a subframe structure, a slot length, and the number of symbols in a slot may be varied. Such a frame structure may be used for an ad-hoc network such as a Device to Device (D2D) UE network for direct communication between UEs or a Vehicular to Everything (V2X) network, and a cellular-based scheme such as LTE-A and Machine Type Communication (MTC). In a conventional wireless communication system, time-frequency resources may be allocated to a UE, and data symbols and reference symbols may be used differently by employing orthogonal resources. Therefore, the signal of each UE may be demodulated without interference from other UEs.

Figure 3:
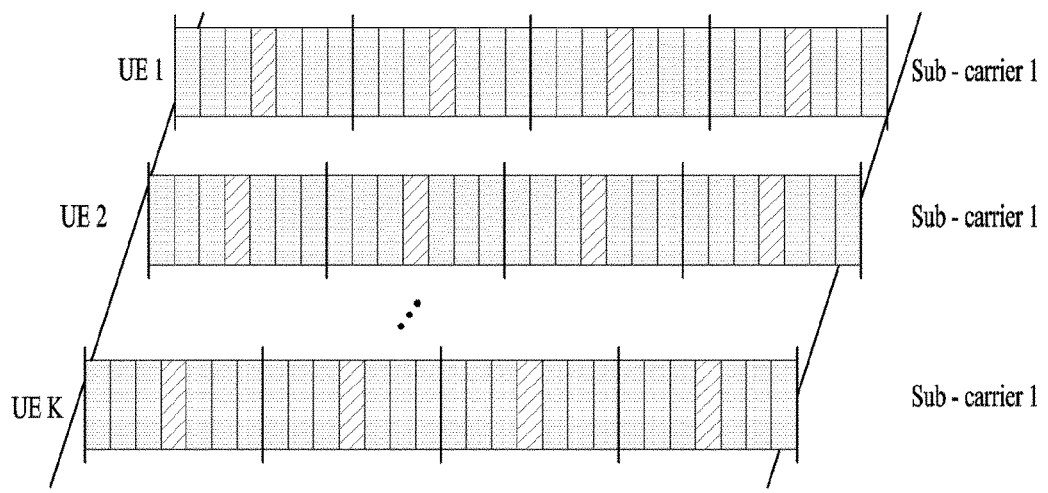
FIG. 3 is a diagram illustrating a frame structure for a non-orthogonal multiple access scheme-based multi-user data overlapping transmission scheme.

FIG. 3 is a diagram illustrating a frame structure for a non-orthogonal multiple access scheme-based multi-user data overlapping transmission scheme.

The frame structure of FIG. 3 is similar to the frame structure of FIG. 2. In the structure, however, non-orthogonal time-frequency resources are allocated to multiple UEs (or users) in a manner that the UEs (or users) share the same frequency resource. For example, as shown in FIG. 3, UE 1 to UE K use the same frequency resource sub-carrier (sub-carrier 1), and thus data symbol overlap with reference symbols.

The reference symbol uses the auto-correlation and cross-correlation properties of a sequence for channel coefficient estimation. If there is a low cross-correlation between multiple sequences, the receiving end may distinguish between overlapping reference symbols of multiple UEs. For example, the respective UE may configure reference symbols based on a Zadoff-Chu sequence, which is one of the CAZAC sequences, so as to overlap with each other for transmission. Depending on the configuration of the sequence, the overlapping reference symbols of the multiple UEs may be perfectly demodulated or maybe demodulated with only very low interference.

Figure 4:
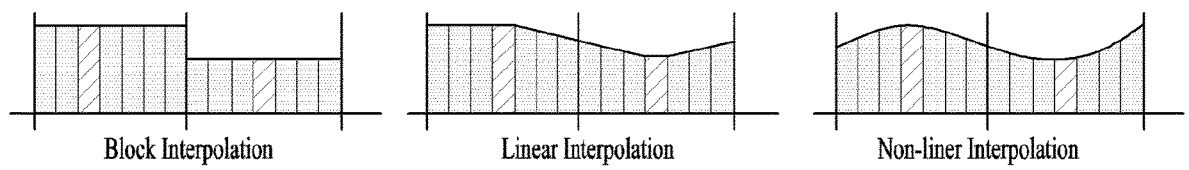
FIG. 4 is an exemplary diagram illustrating interpolation methods for channel estimation.

FIG. 4 is an exemplary diagram illustrating interpolation methods for channel estimation.

For the demodulated reference symbols, channel estimation may be performed using the interpolation methods as shown in FIG. 4. Interpolation may be configured differently according to a system environment or coherence time, and may be configured in various forms by frame structures according to normal CP and extended CP.

On the data symbols, multiuser detection (MUD) may be performed through a receiver supporting NOMA, based on channel estimation by the reference symbols. For example, Maximum Likelihood (ML) detection or Maximum joint A posteriori Probability (MAP), Codeword Interference Cancellation (CWIC) for Multiuser Superposition Transmission (MUST) and Massage Passing Algorithm (MPA) for Sparse Code Multiple Access (SCMA), Parallel Interference Cancellation (PIC) for Interleave Division Multiple Access (IDMA), or the like may be used. The MUD scheme for the data symbols may be variously defined according to the design of a non-orthogonal multiple access transmission/reception scheme.

The non-orthogonal multiple access scheme allows signals of multiple UEs to be transmitted on the same time-frequency resource in an overlapping manner, and accordingly may support higher frequency utilization efficiency or more massive connectivity than the LTE system though it has a higher decoding error rate. The non-orthogonal multiple access scheme may achieve higher frequency utilization efficiency or more massive connectivity while maintaining the decoding error rate through code rate control, depending on the system environment.

As mentioned above, the present invention is directed to provide a UE grouping method and a reference signal hopping method of a non-orthogonal multiple access system for supporting massive connectivity.

Reference Signal Hopping Method for Massive Connectivity

In order to support massive connectivity, a multiple access scheme capable of demodulation while supporting the maximum number of sequence-based reference symbols or more is needed.

Figure 5:
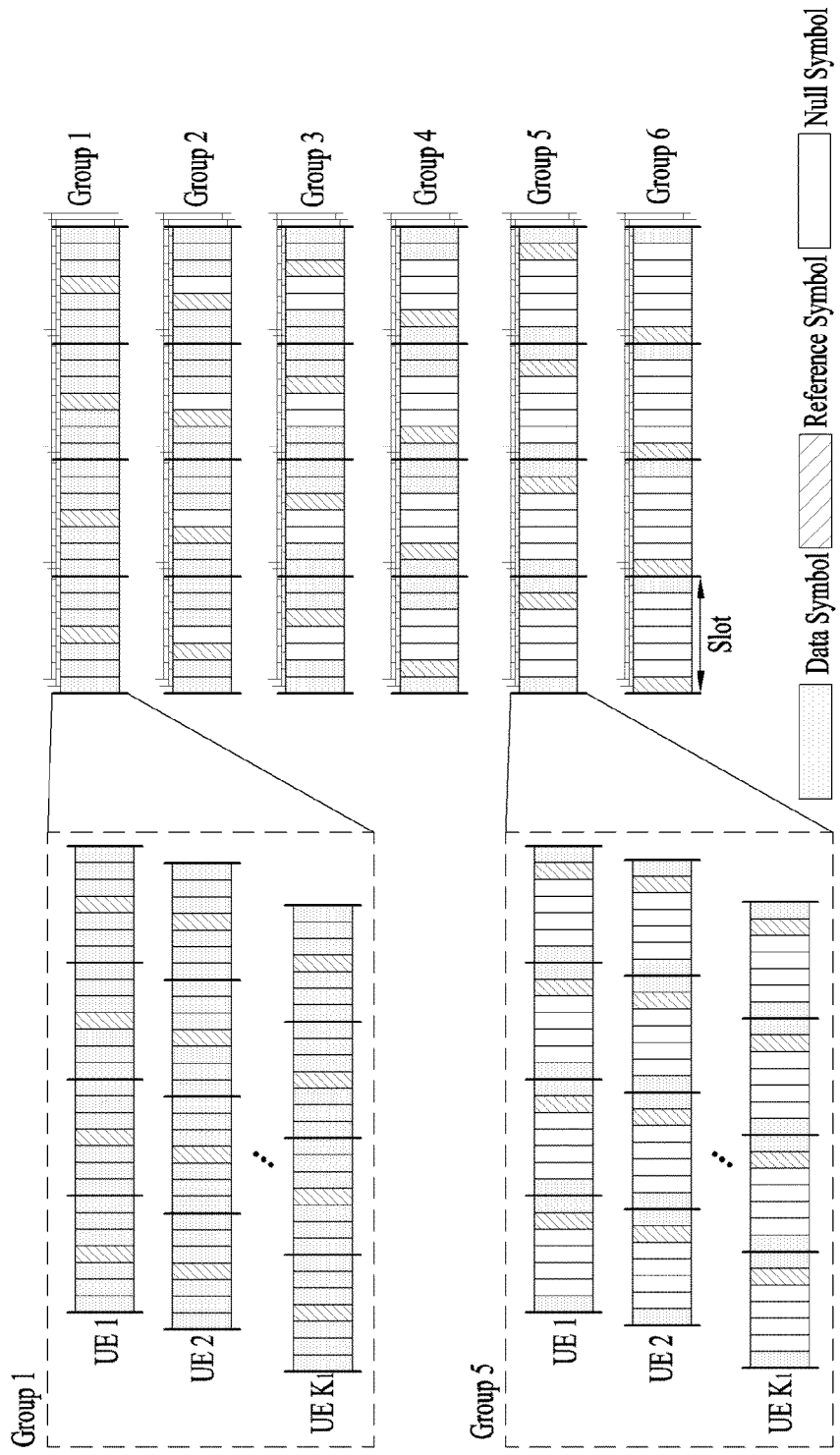
FIG. 5 is a diagram illustrating a frame structure of a reference signal hopping-based NOMA group.

FIG. 5 is a diagram illustrating a frame structure of a reference signal hopping-based NOMA group.

To support massive connectivity support, a multiple access scheme capable of demodulation while supporting the maximum number of sequence-based reference symbols or more is proposed. FIG. 5 shows a frame structure of groups of non-orthogonal multiple access UEs sharing one frequency resource (wherein a UE group is arbitrarily determined, and the UE grouping method will be described in detail in Embodiment 2).

In order to support the maximum number of reference symbols or more, the maximum number of reference symbols in each group is used, and the reference symbols of each group are configured so as not to overlap with the reference symbols of other groups as shown in FIG. 5. For simplicity, the 3GPP LTE will be described as an example. The maximum number of supported UE groups is 6 in the normal CP frame structure of FIG. 5 and may be 5 in the extended CP frame structure. Here, since demodulation of signals becomes more difficult as the number of overlapping groups increases, the number of groups to be used may depend on a system environment or a QoS constraint. In addition, the maximum number of supportable UEs in one group is equal to the maximum number of sequence-based reference signals. Since demodulation of signals becomes more difficult as the number of UEs performing NOMA in one group increases, the number of UEs in the same group may depend on the system environment or QoS constraint. On the other hand, the UEs in the same group may be configured to use different codes or transmit powers such that the BS may distinguish between the UEs in the same group. In addition, when UEs from different groups are also configured to use different codes or transmit powers, the BS may perform decoding with interference between multiple UEs for multiple groups minimized Since the maximum number of overlapping groups through the above-described NOMA scheme is larger than the maximum number of reference symbols, the NOMA service may be supported over multiple groups.

For example, group 1 in FIG. 5 is a multi-UE group performing the NOMA of FIG. 3 and consists of $K_1$ users. As $K_1$, the number of users in group 1, increases, MUD performance for group 1 is degraded. As $K_1$ decreases, MUD performance for group 1 is enhanced. In addition, if only group 1 is served, MUD performance is enhanced without interference applied to other groups, wherein the MUD performance is lowered as the number of served groups increases.

When reference signal hopping is performed on the multiple groups of FIG. 5, the reference symbols of group 1 may be demodulated without interference applied to other groups, and the reference symbols of group 2 need to be demodulated while being subjected to interference by data symbols of group 1. That is, the reference symbols of a lower order group are not affected by interference from the symbols of a higher order group, and the reference symbols of the higher group are affected by interference from the symbols of the lower order group. For a detailed description, the received signal on the symbols in one slot of FIG. 5 is represented by Equation 1 below.

$$y(1) = \sum_{g=1}^{G-1}\sum_{k=1}^{K_g} h_k^{(g)} d_k^{(g)} + \sum_{k=1}^{K_6} h_k^{(6)} P_k + n_1,$$

$$y(2) = \sum_{g=1}^{G-3}\sum_{k=1}^{K_g} h_k^{(g)} d_k^{(g)} + \sum_{k=1}^{K_4} h_k^{(4)} P_k + n_2,$$

$$y(3) = \sum_{g=1}^{G-5}\sum_{k=1}^{K_g} h_k^{(g)} d_k^{(g)} + \sum_{k=1}^{K_2} h_k^{(2)} P_k + n_3,$$

$$y(4) = \sum_{k=1}^{K_1} h_k^{(1)} P_k + n_4,$$

$$y(5) = \sum_{g=1}^{G-4}\sum_{k=1}^{K_g} h_k^{(g)} d_k^{(g)} + \sum_{k=1}^{K_3} h_k^{(3)} P_k + n_5,$$

$$y(6) = \sum_{g=1}^{G-2}\sum_{k=1}^{K_g} h_k^{(g)} d_k^{(g)} + \sum_{k=1}^{K_5} h_k^{(5)} P_k + n_6,$$

$$y(7) = \sum_{g=1}^{G}\sum_{k=1}^{K_g} h_k^{(g)} d_k^{(g)} + n_7.$$

[Equation 1]

Here, y(m) denotes a received signal on the m-th symbol in a slot, and consists of a channel $h_k^{(g)}$ and a data symbol $d_k^{(g)}$ from the k-th UE of the g-th group, a reference symbol $P_k$, and a reception noise $n_m$. G denotes the total number of groups, and $K_g$ denotes the total number of UEs in the g-th group. Since the reference symbols $P_k$ used in the respective groups do not overlap in a reference signal avoidance (or hopping) manner, the same sequence may be used.

Here, the fourth symbol y(4) consists of reference symbols from the UEs of group 1. Since the reference symbol of each UE uses a sequence having a cross correlation set to 0 or set to be as low as possible, channel estimation may be performed by performing auto-correlation with the sequence of the sysmbol. In this case, the maximum value of $K_1$ is equal to the maximum value of $P_k$. Based on the estimated channel information, the data symbols of y(3) from the UEs of group 1 may be detected, which is represented by Equation 2 below. Here, the MUD method may vary according to the NOMA scheme employed.

$$\sum_{g=1}^{1}\sum_{k=1}^{K_1} \widetilde{d_k^{(1)}} = \frac{y(3)}{\widetilde{h^{(1)}}} = \sum_{g=1}^{1}\sum_{k=1}^{K_1} d_k^{(1)} + \sum_{k=1}^{K_2} \frac{h_k^{(2)}}{\widetilde{h^{(1)}}} P_k + \frac{n_3}{\widetilde{h^{(1)}}}$$

[Equation 2]

In Equation 2, $\widetilde{h^{(1)}}$ is a channel compensation term for the multiple UEs of Group 1. Equation 2 may be changed according to the channel compensation scheme. In Equation 2, the second term on the right side represents interference by reference symbols from the users of group 2, and the third term has a changed noise value.

The third symbol y(3) consists of the data symbols from the UEs of group 1 and the reference symbols from the UEs of group 2 (see Equation 3 below). Therefore, when the data symbols from the UEs of group 1 are demodulated, channel estimation may be performed by removing interference with the reference symbols of group 2.

$$\sum_{k=1}^{K_2} h_k^{(2)} P_k + n_3 = y(3) - \sum_{g=1}^{1}\sum_{k=1}^{K_1} \widetilde{h_k^{(1)}} \widetilde{d_k^{(1)}}$$

[Equation 3]

Here, since the data symbols from the UEs of group 1 are demodulated while being subjected to interference with the reference symbols of group 2, there may be an error in the demodulation. Accordingly, the data symbols from the UEs of group 1 may be repeatedly detected by reflecting channel estimation through the reference symbols of group 2. This operation may be represented as Equation 4 below.

$$\sum_{g=1}^{1}\sum_{k=1}^{K_1} \widetilde{d_k^{(1)}} + \widetilde{n_3} = y(3) - \sum_{k=1}^{K_2} \widetilde{h_k^{(2)}} P_k$$

In this way, the received signals from y(1) to y(7) may be repeatedly demodulated. The repetitive inter-group demodulation procedure may be represented by a diagram shown in FIG. 6.

Figure 6:
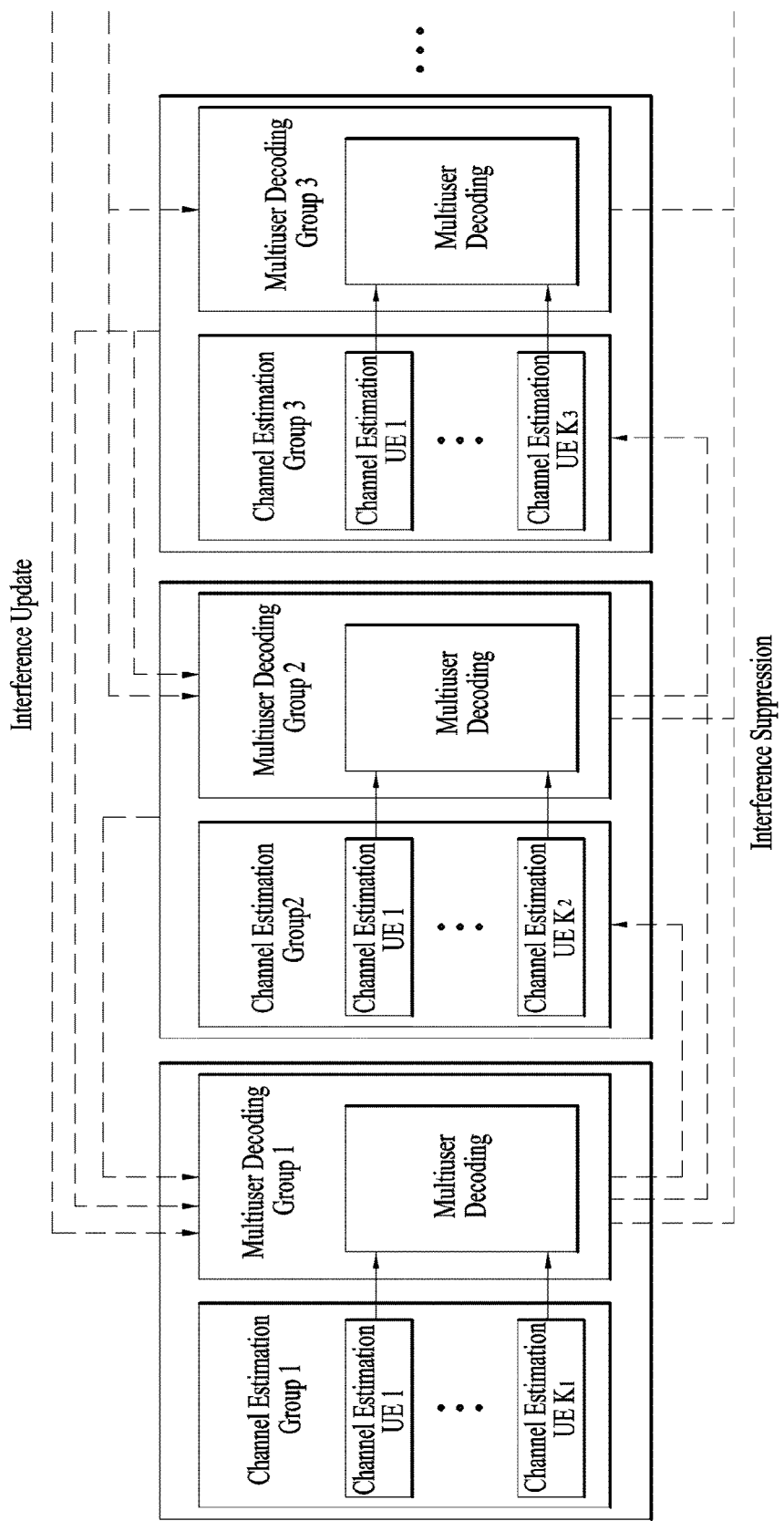
FIG. 6 is a diagram illustrating a procedure for repetitive multi-group detection.

FIG. 6 is a diagram illustrating a procedure for repetitive multi-group detection.

In FIG. 6, the MUD scheme for each group may be variously defined through a receiver supporting NOMA. For example, Maximum Likelihood (ML) detection or Maximum joint A posteriori Probability (MAP), Codeword Interference Cancellation (CWIC) for Multiuser Superposition Transmission (MUST) and Massage Passing Algorithm (MPA) for Sparse Code Multiple Access (SCMA), Parallel Interference Cancellation (PIC) for Interleave Division Multiple Access (IDMA), or the like may be used. The MUD scheme for the data symbols may be variously defined according to the design of a non-orthogonal multiple access transmission/reception scheme.

With the proposed method, the maximum number of sequences of the reference signal may be multiplied by the number of groups to support massive connectivity. An exemplary reference signal hopping pattern according to the above-described method is described below.

Embodiment 1: Reference Signal Hopping Pattern Based on Normal Cyclic Prefix (CP) Frame Structure FIG. 7 is a diagram illustrating an exemplary normal CP frame structure-based reference signal hopping pattern.

Figure 7:
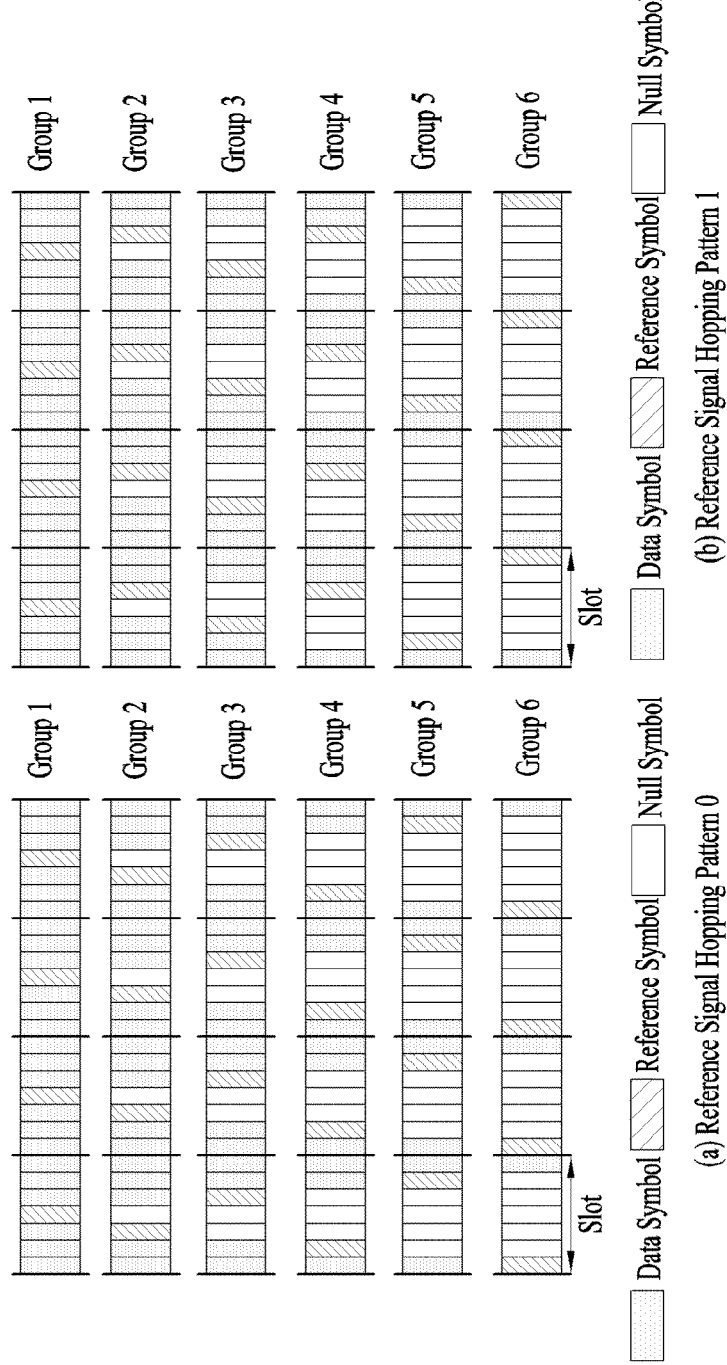
FIG. 7 is a diagram illustrating an exemplary normal CP frame structure-based reference signal hopping pattern.

FIG. 7 exemplarily shows a reference signal hopping pattern in two subframes. In Group 1 of FIG. 7, the block interpolation, linear interpolation, or non-linear interpolation of FIG. 4 may be performed according to the system environment. On the other hand, in the other groups, the reference signal is not positioned at the center of the slot and is separated from the data symbol, and accordingly performance of block interpolation may be degraded. Accordingly, the UE may prevent degradation of channel estimation performance by performing block interpolation on three symbols on each of the left and right sides of the reference symbol. In this case, channel estimation is performed across a slot boundary. For example, in Group 4 of reference signal hopping pattern 0 illustrated in FIG. 7(a), block interpolation is performed on the three symbols preceding the reference symbol (the first symbol of a reference slot, the sixth and seventh symbols of the previous slot). Similarly, in Group 5, block interpolation is performed on the two symbols following the reference symbol (the seventh symbol of the reference slot and the first symbol of the next slot).

The same scheme is applicable to the other groups and the groups of reference signal hopping pattern 1 shown in FIG. 7(b). Alternatively, channel estimation performance may be improved through linear interpolation and non-linear interpolation.

Embodiment 1 is an example of a reference signal hopping pattern, which applies even to another pattern in which reference symbols are arranged so as not to overlap with each other and the maximum number of reference symbols is used in each group.

Embodiment 2: Reference Signal Hopping Pattern Based on Extended CP Frame Structure FIG. 8 is a diagram illustrating an exemplary extended CP frame structure-based reference signal hopping pattern.

Figure 8:
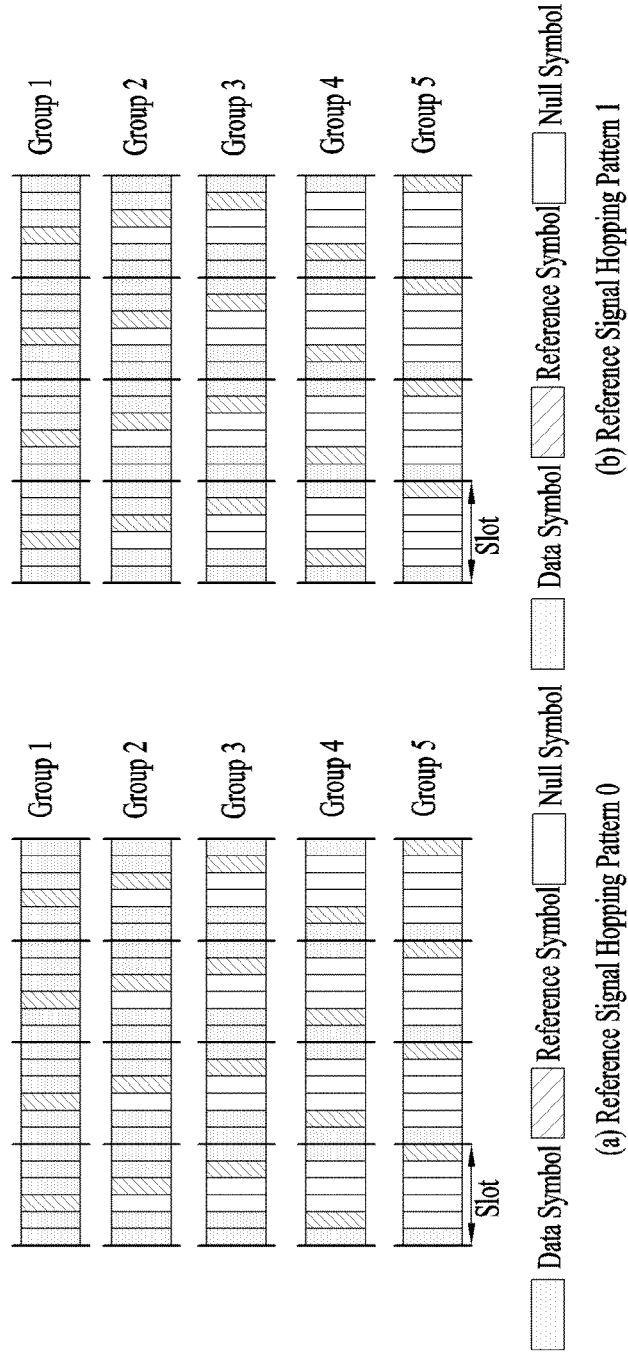
FIG. 8 is a diagram illustrating an exemplary extended CP frame structure-based reference signal hopping pattern.

FIG. 8 exemplarily shows a reference signal hopping pattern in two subframes. In Groups 1 and 2 of FIG. 8, the block interpolation, linear interpolation, or non-linear interpolation of FIG. 4 may be performed according to the system environment. On the other hand, in the other groups, the reference signal is not positioned at the center of the slot and is separated from the data symbol, and accordingly performance of block interpolation may be degraded. Accordingly, degradation of channel estimation performance may be prevented by performing block interpolation on two symbols on the left side and three symbols on the right side of the reference symbol. In this case, channel estimation is performed across a slot boundary.

For example, in Group 3 of reference signal hopping pattern 0 illustrated in FIG. 8(a), block interpolation is performed on the three symbols following the reference symbol (the sixth symbol of the reference slot and the first and second symbols of the next slot). Similarly, in Group 4, block interpolation is performed on the two symbols preceding the reference symbol (the first symbol of the reference slot and the sixth symbol of the previous slot). The same scheme is applicable to the other groups and the groups of reference signal hopping pattern 1 shown in FIG. 8(b). Alternatively, channel estimation performance may be improved through linear interpolation and non-linear interpolation.

Embodiment 2 is an example of a reference signal hopping pattern, which applies even to another pattern in which reference symbols are arranged so as not to overlap with each other and the maximum number of reference symbols is used in each group.

Non-Orthogonal Multiple Access UE Grouping for Massive Connectivity

In order to perform the aforementioned reference signal hopping method for mass connectivity, a definition and signaling of non-orthogonal multiple access scheme-based UE grouping are needed.

Non-orthogonal multiple access scheme-based UE grouping for carrying out reference signal hopping presented in the reference signal hopping method for mass connectivity described above is provided. In the reference signal hopping method for mass connectivity, reference signal hopping according to UE groups exhibits different demodulation performance between the groups. Since the reference signal of Group 1 can be received without interference, it may ensure channel estimation performance, and better reception performance may be expected due to the difference in amount of interference among the data symbols. For example, in FIG. 5, the third symbol of Group 1 has only interference from the reference symbol of Group 2. The reference symbol is pre-known information and interference cancellation performance is excellent. On the other hand, the fifth symbol of the Group 2 has interference by the data symbols of Group 1 and interference from the reference symbol of the Group 3, and thus demodulation performance may be degraded. Even if repetitive multi-group detection is performed, it may be expected that the demodulation performance will be degraded in a group having a large amount of interference. Therefore, the demodulation performance of a lower order group (for example, Group 1 is the lowest order group) is more excellent, and data transmission may be performed at a higher modulation and coding scheme (MCS) level. In addition, a higher data rate may be expected when the same resource is allocated. On the other hand, the reception demodulation performance of a higher order group (for example, Group 5 is the highest order group) is lower, and data transmission should be performed at a lower MCS level.

In addition, a lower order group may transmit more data symbols, and a higher order group should transmit fewer data symbols than the lower order group due to use of a null symbol for reference symbol detection of the higher order group. Accordingly, UE scheduling and UE grouping considering the MCS levels of the groups and the data rates that may be provided.

Group Grouping Method 1

The BS may allocate a UE having a larger amount of transmission traffic to a lower order group and a UE having a smaller amount of transmission traffic to a higher order group based on scheduling requests (SRs) of the UEs and required data rates. In this case, the UE may transmit the amount of transmission traffic to the BS over a Buffer State Report (BSR) on a data channel (e.g., physical uplink shared channel (PUSCH)), and thus the BS may recognize the amount of traffic. The BSR may be transmitted as a regular BSR, periodic BSR or padding BSR.

Group Grouping Method 2

The BS may configure UEs having similar timing distances in a group according to the timing distances of the UEs. The timing distance may be determined according to a propagation delay due to the multipath of the UE or the system environment as well as the physical distance. In this case, a UE group having a longer timing distance may be allocated as a lower order group to ensure a data rate.

Group Grouping Method 3

The BS may group UEs based on the fairness indexes of the UEs. Users with lower fairness indexes of UEs may be allocated to a lower order group to ensure fairness. Here, a fairness index may be determined based on existing proportional fairness and may be defined through other fairness indexes. For example, various indexes including the Jain's fairness index and the max-min fairness index may be used. With the group grouping method proposed in the present invention, UE grouping fairness of the non-orthogonal multiple access scheme may be supported.

Hereinafter, the processing procedure of reference signal hopping pattern 1 for exchange of UE grouping information and mass connectivity described above will be described.

Figure 9:
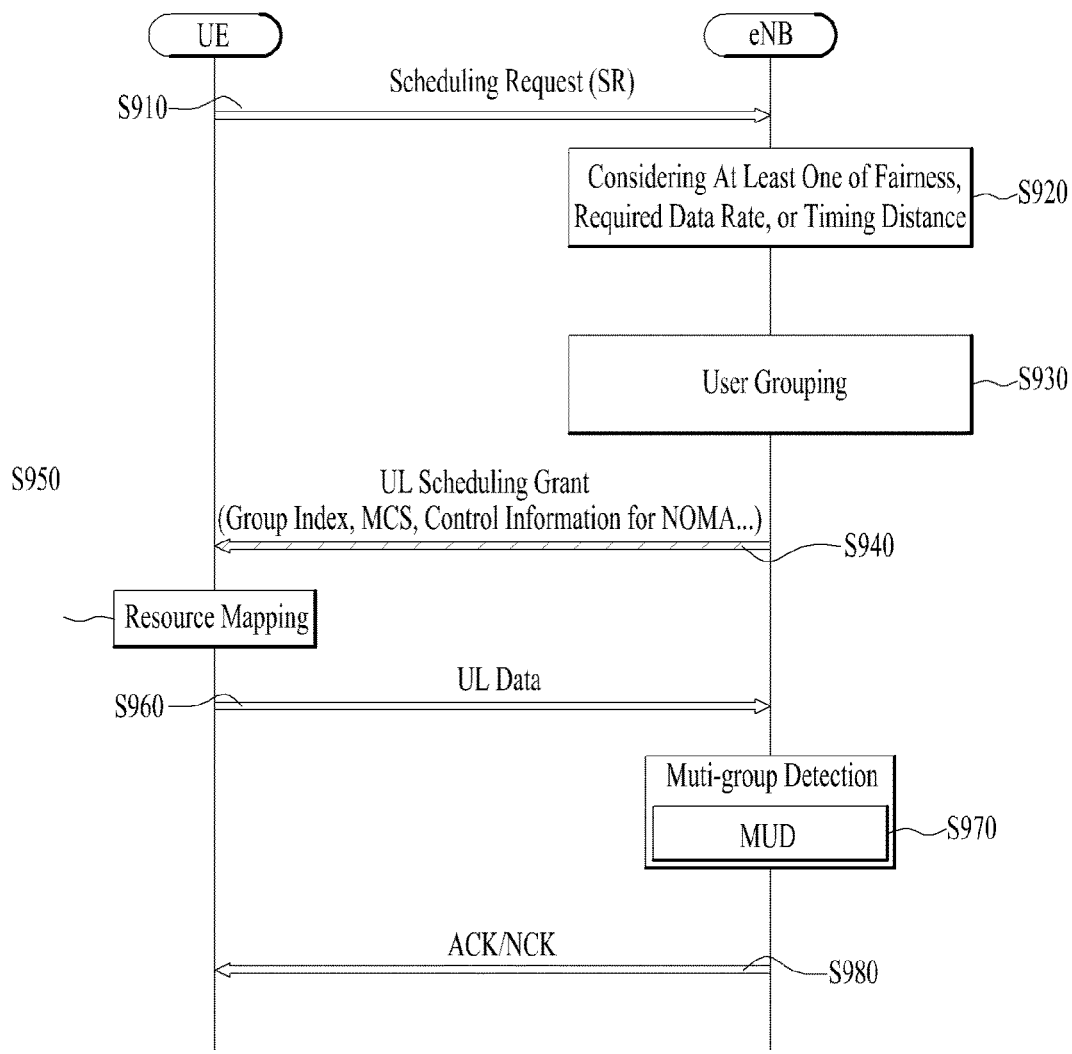
FIG. 9 is an exemplary diagram illustrating a procedure for a Massive Sporadic Packet Service.

FIG. 9 is an exemplary diagram illustrating a procedure for a Massive Sporadic Packet Service.

FIG. 9 illustrates a non-orthogonal multi-group multiple access scheme-based structure. The UE may transmit an uplink traffic transmission request thereof to the BS (eNB) through a scheduling request (SR) signal (S910). The BS may perform scheduling based on the group grouping methods (e.g., group grouping methods 1, 2, and 3) described above according the channel environment of a UE and the state of the other UEs (S920). In addition, the BS performs UE grouping based on at least one of the group grouping methods (e.g., group grouping methods 1, 2, and 3) described above (S930). In contrast with the conventional system, when the non-orthogonal multiple access group of the UE is determined, the group index, the control information for non-orthogonal multiple access (e.g., power allocation information for MUST or codebook index for SCMA, interleaver index for IDMA, etc.), an MCS level, and the like may be transmitted to the UE through an uplink scheduling grant (e.g., a UL grant) of a control channel (e.g., Physical Downlink Control Channel (PDCCH)) (S940). Here, the reference signal hopping pattern may be cell-specifically pre-defined, or the BS may inform the UE of a reference signal hopping pattern index through the UL grant. In addition, the MCS level may be defined on a group-by-group basis or may be user-specifically defined.

The UE may transmit uplink data to the BS by mapping data symbols and reference symbols to resources based on the group index and the resource allocation information included in the UL grant (S950 and S960). The BS performs repetitive demodulation on multiple groups, and performs MUD within demodulation of each group, thereby demodulating the signals of the multiple UE of the multiple groups (S970). The BS transmits an ACK or NACK feedback signal to the UE based on the demodulated signal (S980).

Using the reference signal hopping method for mass connectivity and the non-orthogonal multiple access UE grouping method for mass connectivity described above, a demodulation-enabled non-orthogonal multi-group multiple access scheme may be carried out while at least the maximum number of sequence-based reference symbols are supported.

While it is illustrated that the transmitting entity is a user equipment (UE) and the receiving entity is a BS (eNB) on uplink, the configuration may be properly applied according to arrangement of PDSCH and cell-specific RS on downlink. The scheme described above may be specified as Partially Overlapping Multiple Access (PoMA).

In the legacy LTE system, transmission of an SR signal may be UE-specifically performed at an implicit position. This operation may be possible because the maximum number of available Cell Radio Network Temporary Identifiers (C-RNTIs) is merely 216. However, connectivity of mMTC is considered to be 1,000,000/km². When it is assumed that the mMTC UEs are in the RRC_CONNECTED state, the amount of reserved resources required for transmitting the SR at an implicit position may be about 20 times the amount in the conventional case. That is, 40 RBs, which are 20 times the 2 RBs at both ends of the frequency domain for SR transmission in the legacy LTE system, should be reserved. 40 RBs may occupy a large part of the system bandwidth, thereby greatly reducing resources for data transmission and reception. Therefore, there is a need for an SR transmission scheme capable of supporting massive connectivity.

PoMA-Based Scheduling Request (SR) and Data Overlapping Scheme

The aforementioned PoMA may have reliability differing among the groups. The DMRS of the lowest order group may be transmitted without interference, and allow information transmission in the widest resource region. Based on these characteristics, the SR may be transmitted in the lowest order group. For this operation, the lowest order group is always reserved for the SR in the region in which PoMA operates. That is, in the region in which PoMA operates, a group that maximizes reliability of a reference signal (e.g., DMRS) and data is determined as an SR group (or SR resource group). For example, it may be represented as shown in FIG. 10.

Figure 10:
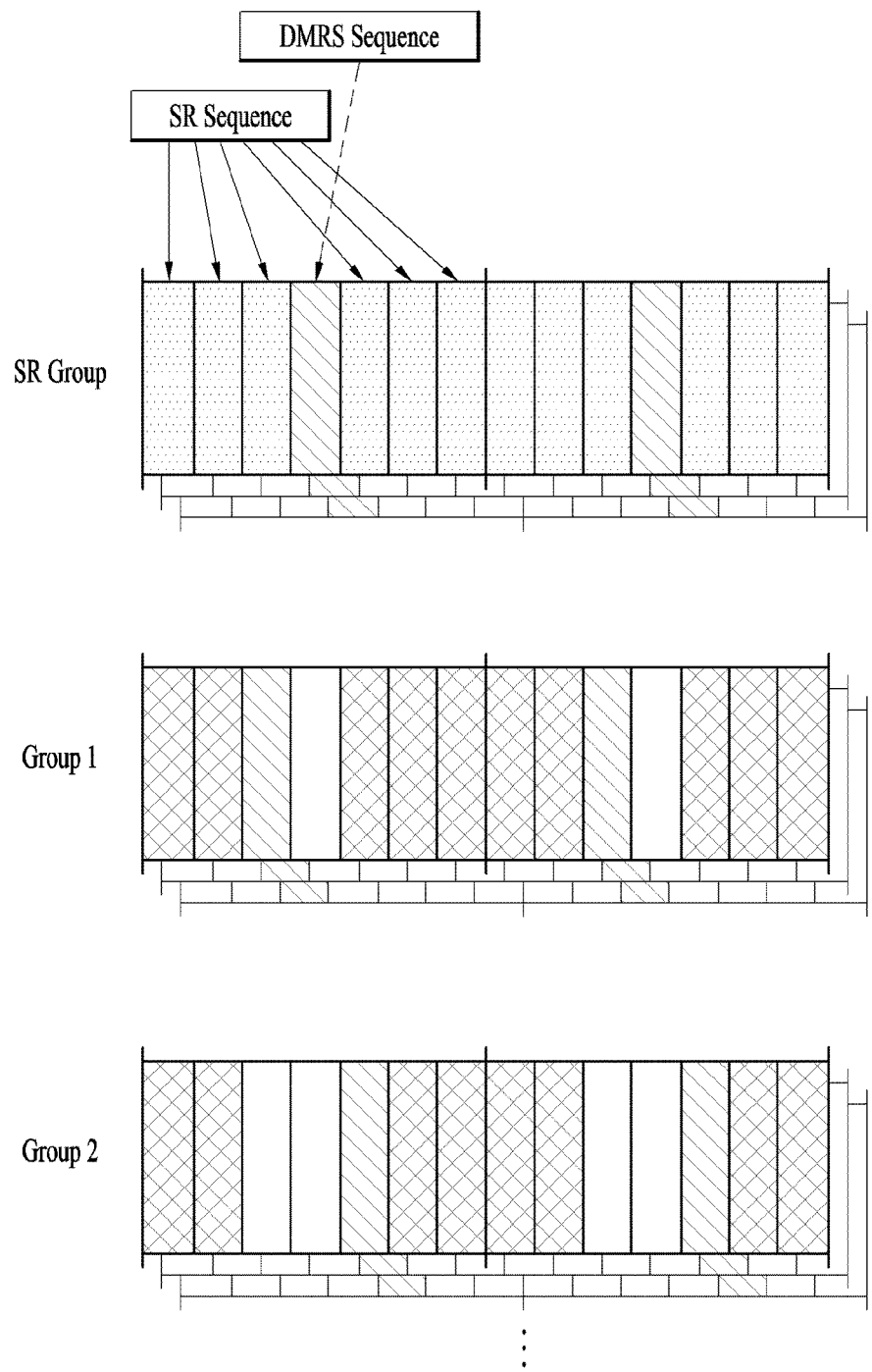
FIG. 10 is an exemplary diagram illustrating a PoMA-based SR and data overlapping scheme.

FIG. 10 is an exemplary diagram illustrating a PoMA-based SR and data overlapping scheme.

As shown in FIG. 10, the DMRS of the SR group may be demodulated without interference applied to other groups, and the DMRS of Group 1 should be demodulated while being subjected to interference applied by the SR sequence of the SR group. Here, the other groups (Group 1, Group 2, . . . ) refer to groups of UEs that perform data transmission. That is, the DMRS of the SR group is not subjected to interference from the symbols of the other groups, while the DMRS of the data group (or data resource group) is subjected to interference from the symbols of the SR group. For more detailed description, the received signal on the symbols in one slot of FIG. 10 is represented by Equation 5 below.

$$y(1) = \sum_{j=1}^{K_s} h_j^{(s)} S_j^{(s)} + \sum_{g=1}^{G-1} \sum_{k=1}^{K_g} h_k^{(g)} d_k^{(g)} + \sum_{k=1}^{K_6} h_k^{(6)} P_k + n_1,$$

$$y(2) = \sum_{j=1}^{K_s} h_j^{(s)} S_j^{(s)} + \sum_{g=1}^{G-3} \sum_{k=1}^{K_g} h_k^{(g)} d_k^{(g)} + \sum_{k=1}^{K_4} h_k^{(4)} P_k + n_2,$$

$$y(3) = \sum_{j=1}^{K_s} h_j^{(s)} S_j^{(s)} + \sum_{g=1}^{G-5} \sum_{k=1}^{K_g} h_k^{(g)} d_k^{(g)} + \sum_{k=1}^{K_2} h_k^{(2)} P_k + n_3,$$

$$y(4) = \sum_{j=1}^{K_s} h_j^{(s)} P_j + n_4,$$

$$y(5) = \sum_{j=1}^{K_s} h_j^{(s)} S_j^{(s)} + \sum_{g=1}^{G-4} \sum_{k=1}^{K_g} h_k^{(g)} d_k^{(g)} + \sum_{k=1}^{K_3} h_k^{(3)} P_k + n_5,$$

[Equation 5]

$$y(6) = \sum_{j=1}^{K_s} h_j^{(s)} S_j^{(s)} + \sum_{g=1}^{G-2} \sum_{k=1}^{K_g} h_k^{(g)} d_k^{(g)} + \sum_{k=1}^{K_5} h_k^{(5)} P_k + n_6,$$

$$y(7) = \sum_{j=1}^{K_s} h_j^{(s)} S_j^{(s)} + \sum_{g=1}^{G} \sum_{k=1}^{K_g} h_k^{(g)} d_k^{(g)} + n_7.$$

Here, y(m) denotes a received signal on the m-th symbol in a slot, and consists of a channel $h_k^{(g)}$ and a data symbol $d_k^{(g)}$ from the k-th user of the g-th data group, a reference symbol $P_k$, and a reception noise $n_m$. $K_s$ is the total number of users (UEs) transmitting the SR and $h_j^{(s)}$ denotes a channel (or channel coefficient) of the j-th user transmitting the SR. G denotes the total number of data groups, and $K_g$ denotes the total number of users (UEs) in the g-th data group. Since the reference symbols $P_k$ used in the respective SR or data groups do not overlap in a reference signal avoidance (or hopping) manner, the same sequence may be used.

Here, the fourth symbol y(4) consists of reference symbols from the SR group users. Since the reference symbol of each user uses a sequence having a cross correlation set to 0 or set to be as low as possible, channel estimation may be performed by performing auto-correlation with the sequence of the symbol. In this case, the maximum value of $K_s$ is equal to the maximum value of $P_k$. As shown in Equation 6 below, the BS may detect the SR sequences from the SR group users of y(3) based on the estimated channel information.

$$\sum_{j=1}^{K_s} \hat{S}_j^{(s)} = \frac{y(3)}{\widetilde{h^{(s)}}} = \sum_{j=1}^{K_s} S_j^{(s)} + \sum_{k=1}^{K_1} \frac{h_k^{(1)}}{\widetilde{h^{(s)}}} P_k + \frac{n_3}{\widetilde{h^{(s)}}} \quad \text{[Equation 6]}$$

Here, $\widetilde{h^{(s)}}$ is a channel compensation term for the multiple users of the SR group. Equation 6 may be changed according to the channel compensation scheme. The second term on the rightmost side of the equation is interference by reference symbols from the users of the first data group, and the third term is the changed noise value.

The third symbol y(3) consists of the SR sequences from the users of SR group and the reference symbols from the users of the first data group. Accordingly, when the SR sequences from the SR group users are detected, channel estimation may be performed by removing interference on the reference symbols of the first data group, which may be represented by Equation 7.

$$\sum_{k=1}^{K_1} h_k^{(1)} P_k + n_3 = y(3) - \sum_{k=1}^{K_s} h_j^{(s)} S_j^{(s)} \quad \text{[Equation 7]}$$

Here, since the SR sequences from the SR group users are demodulated while being subjected to interference with the reference symbols of the first data group, there may be an error in the demodulation. Accordingly, the BS may repeatedly detect the SR sequences from the SR group users, reflecting the channel estimation through the reference symbols of the first data group.

$$\sum_{j=1}^{K_s} \widetilde{S_j^{(s)}} + \widetilde{n_3} = y(3) - \sum_{k=1}^{K_1} \widetilde{h_k^{(1)}} P_k \quad \text{[Equation 8]}$$

In this way, the received signals from y(1) to y(7) may be repeatedly demodulated as shown in Equation 7.

As described above, the sequences or the data and DMRS patterns of the SR and data groups may be predefined in the system. For example, considering the self-contained subframe of the NR system, DMRS may be arranged on the first symbol.

The above-described scheme may increase reliability, similar to the SR structure of the legacy LTE system. For example, grouping may be performed in a structure as shown in FIG. 11.

Figure 11:
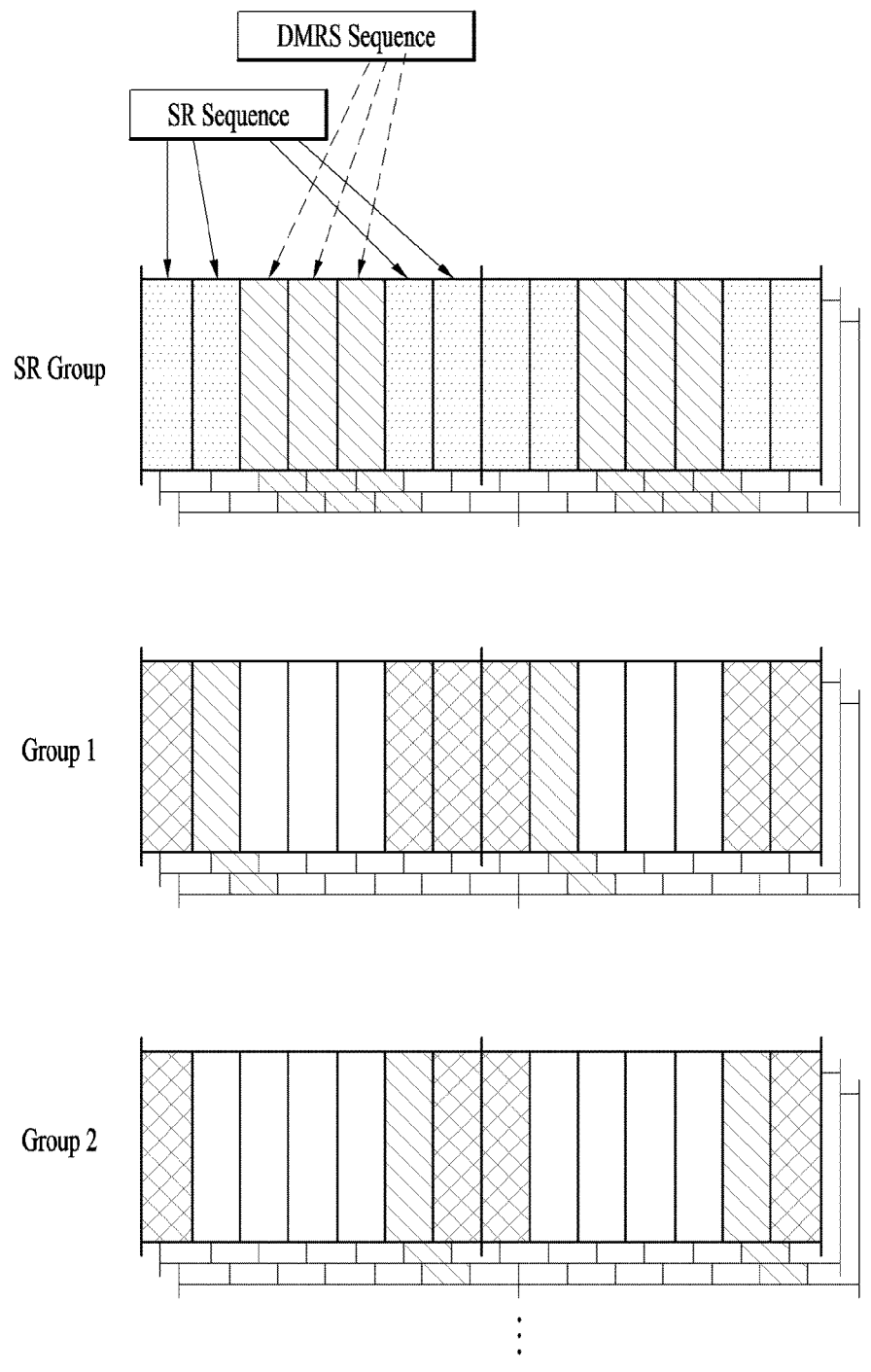
FIG. 11 is an exemplary diagram illustrating a PoMA-based SR and data overlapping scheme.

FIG. 11 is an exemplary diagram illustrating a PoMA-based SR and data overlapping scheme.

When grouping is performed as illustrated in FIG. 11, reliability of channel estimation through DMRS of the SR group may be enhanced. On the other hand, the number of groups using data is limited. In addition, in order to ensure reliability of the SR, the BS may limit the number of groups in which the SR and data overlap with each other in the PoMA manner. For example, the BS may broadcast common control information to the UE in the common DCI or RRC phase to indicate the number of data groups transmitting data with respect to resources on which the SR is transmitted based on a threshold for the detection error probability of the SR (e.g., limited indication). For example, Table 1 below specifies the number of data groups allowed by an SR reliability indication field (or a reliability indication field related to SR reception) corresponding to an SR detection error rate or shows content that indicates the allowed data groups.

TABLE 1

| SR Detection Error Probability(Pr) | SR Reliability Indication field | Allowed Data Group |
|---|---|---|
| Pr < Threshold 1 | 00 | 1, 2, 3, 4 |
| Threshold 1 <= Pr < Threshold 2 | 01 | 1, 3 |
| Threshold 2 <= Pr < Threshold 3 | 10 | 1 |
| Threshold 4 <= Pr | 11 | 4 |

The allowed data groups shown in Table 1 may be predefined in the system and pre-agreed between the system and the UE. The UE may receive the SR reliability indication field through common DCI or RRC signaling and transmit data through resources allocated to the data groups indicated by the SR reliability indication field.

In the SR and data overlapping scheme proposed in FIG. 11, for data, ACK/NACK for data transmission may be determined through cyclic redundancy check (CRC). On the other hand, in the SR group, the UE transmits the sequence in an unscheduled manner, and accordingly it is difficult to accurately determine whether the sequence is detected due to interference caused by overlapping with the data groups. For this reason, an operation to improve the detection accuracy for the SR sequence may be needed. Therefore, the SR detection accuracy may be improved through the repetitive detection procedure (e.g., SIC-based group detection) only when the ACK ratio of the data groups exceeds a certain threshold.

The ACK ratio of the data groups may be utilized in place of the SR detection error probability Pr described above. For example, the threshold of the ACK ratio may be set based on the CRC of the data of all users included in the entire data group, and the operation of controlling the number of groups may be performed.

TABLE 2

| ACK Ratio of data group (Pa) | SR Reliability Indication field | Allowed data group |
|---|---|---|
| Pa < Threshold 1' | 00 | 1, 2, 3, 4 |
| Threshold 1' <= Pa < Threshold 2' | 01 | 1, 3 |
| Threshold 2' <= Pa < Threshold 3' | 10 | 1 |
| Threshold 4' <= Pa | 11 | 4 |

The allowed data groups shown in Table 2 may be predefined in the system and pre-agreed between the system and the UE.

The SR reliability indication field of Table 2 may be defined as an SR zone-specific reliability indication field. The SR reliability indication field is specified for the entire region in which the SR and the data overlap with each other. Accordingly, when there is a plurality of regions in which the SR and the data overlap with each other, it may be difficult to control each region. Therefore, each overlapping region may be dynamically controlled through the SR zone-specific reliability indication field. In this case, the number of SR zone-specific reliability indication fields increases by the number of zones, thereby increasing the amount of control information. However, data transmission efficiency may be improved while maintaining the reliability of each region through dynamic control of each overlapping region.

Operation in the Case where Scheduling-Based MA is Applied to PoMA-Based Uplink Data Transmission Based on Dynamic Control of the Number of Data Groups According to the SR Reliability (or Reliability Related to SR Reception) Described Above The BS determines a data transmission region and a data group based on dynamic control of the number of data groups and schedules uplink transmission based on channel state information (CSI) of the UE (or user). Information about the scheduled uplink data transmission is transmitted to the UE through a UL grant (e.g., DCI format 0 or 4). The UE performs uplink data transmission based on the received UL grant.

In the case where contention-based MA is applied to PoMA-based uplink data transmission based on dynamic control of the number of data groups according to the SR reliability described above, the following operation may be performed.

The BS determines a data transmission region and a data group based on dynamic control of the number of data groups and configures a contention-based MA region. The BS broadcasts data groups in which contention-based MA is performed to the UE through group-specific DCI or common DCI (For example, it signals allowed data groups through the SR reliability indication field mentioned in Table 2 above). The UE performs condition-based uplink data transmission within the allowed data groups based on the received DCI. Here, reliability may differ between PoMA-based data groups. Accordingly, the UE may select a data group from among the allowed data groups according to the reliability based on any rule or a predefined rule.

When contention-based MA is applied to PoMA-based uplink data transmission, the UE may perform SR transmission and contention-based uplink data transmission in one PoMA region. If there is a predefined SR region in the PoMA group, the UE transmits uplink data by selecting a data group according to the reliability through the contention-based MA operation, and transmits an SR sequence for a scheduling request through the SR group, which is the lowest order group. In this case, since the UE multiplexes the data and the SR sequence, the power for the SR sequence transmission may be lower than the power given when multiplexing is not performed. Therefore, in this case, the following operation may be performed.

When the SR transmit power selected based on the open loop power control by estimation of a path loss by a DL synchronization signal or a DL control channel is greater than or equal to the maximum transmit power, the UE performs only SR sequence transmission and does not perform contention-based uplink data transmission.

When the SR transmit power selected based on the open loop power control by estimation of a path loss by a DL synchronization signal or a DL control channel is less than or equal to the maximum transmit power, the UE performs SR sequence transmission in the SR group, and performs contention-based uplink data transmission in the PoMA data group at the remaining power obtained by subtracting the SR transmit power from the maximum transmit power.

Here, if the remaining uplink data transmit power obtained by subtracting the SR transmit power from the maximum transmit power is less than or equal to a specific threshold (which may be predefined or defined a value at which the receiving side determines that the corresponding power cannot be received based on the open loop power control), the UE may not perform contention-based UL data transmission.

In all the above-described schemes, the SR group may not have DMRS. In this case, the DMRS of the SR group is replaced with the SR sequence since SR sequence transmission can be performed only by sequence detection without DMRS. Then, the BS may receive the SR sequence corresponding to the existing DMRS position of the SR group without interference. However, detection performance may not be ensured with a single SR sequence due to inter-cell interference and an insufficient signal to noise ratio (SNR). Therefore, the BS may perform detection by combining the sequence with an SR sequence (an SR sequence position different from the existing DMRS position) where there is inter-group interference.

Further, since demodulation of the SR sequence becomes more difficult as the number of users performing data transmission through NOMA in one group increases, the number of users in the data group may be varied depending on the system environment or QoS constraint. In addition, the amount of interference may be controlled by controlling the receive power of the data group to improve or ensure reliability of the SR group. In this case, the grant of DCI designated for the data group may be configured to include a power command for power control. Thereby, the UE may perform power control based on the grant.

Figure 12:
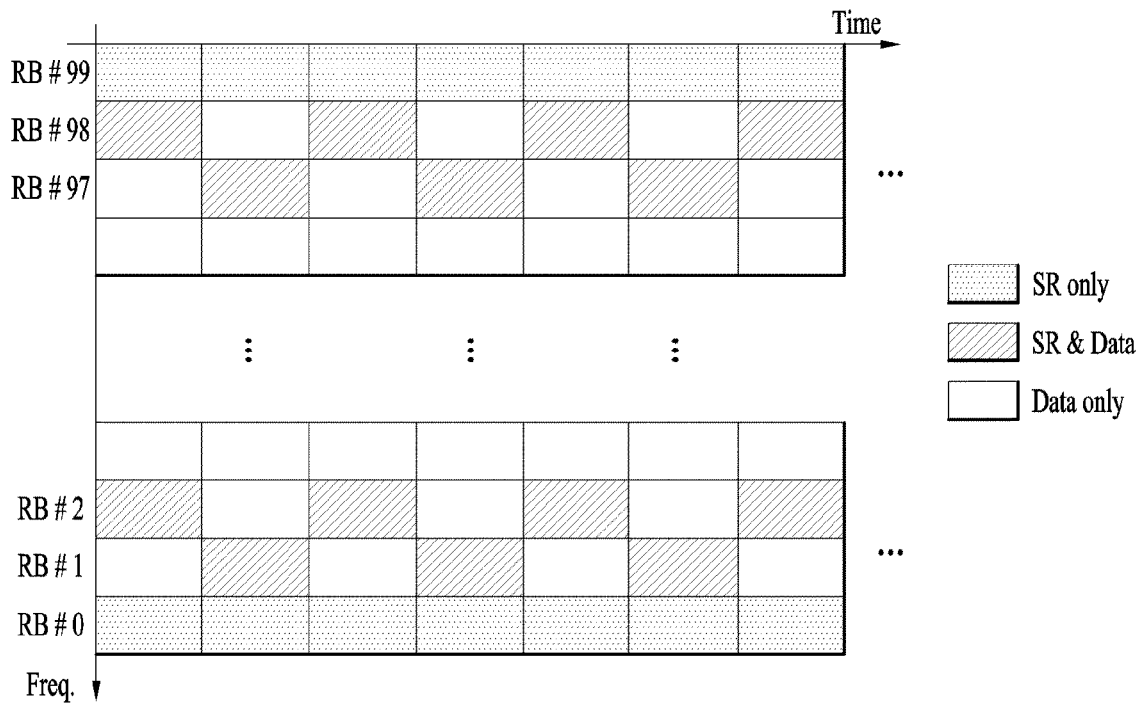
FIG. 12 is an exemplary diagram illustrating a PoMA-based SR and data overlapping scheme.

FIG. 12 is an exemplary diagram illustrating a PoMA-based SR and data overlapping scheme.

As shown in FIG. 12, the PoMA-based SR and data overlapping scheme may be implemented with respect to a specific band. For example, the region may be divided into an SR Only region (i.e., a region where only SR is transmitted without uplink data) and a SR and Data region (denoted by SR & Data in FIG. 12) (i.e., a PoMA overlapping region as a region where SR and uplink data are transmitted together in an overlapping manner), and a Data Only region (i.e., a region where only uplink data is transmitted) in the pattern shown in FIG. 12, and the regions may be pre-agreed between the BS and the UE in a predefined pattern. In addition, the BS may transmit information about the pattern for each frequency band shown in FIG. 12 to the UE through signaling such as common DCI or RRC. In this case, the BS may signal to the UE a field indicating an adaptive operation for multiple patterns.

Reliability of SR sequence detection may differ between the SR Only region and the SR and Data region. Accordingly, SR transmission of the UE may be tied only to the SR Only region and implicitly performed or may be tied only to the SR and Data region and not be implicitly performed. For example, the SR transmission of the UE may have a specific period, and be cross-tied to the SR Only region and the SR and Data region to provide SR detection reliability for the BS.

Considering a self-contained subframe of the NR system, the pattern of the SR Only region may be varied.

Figure 13:
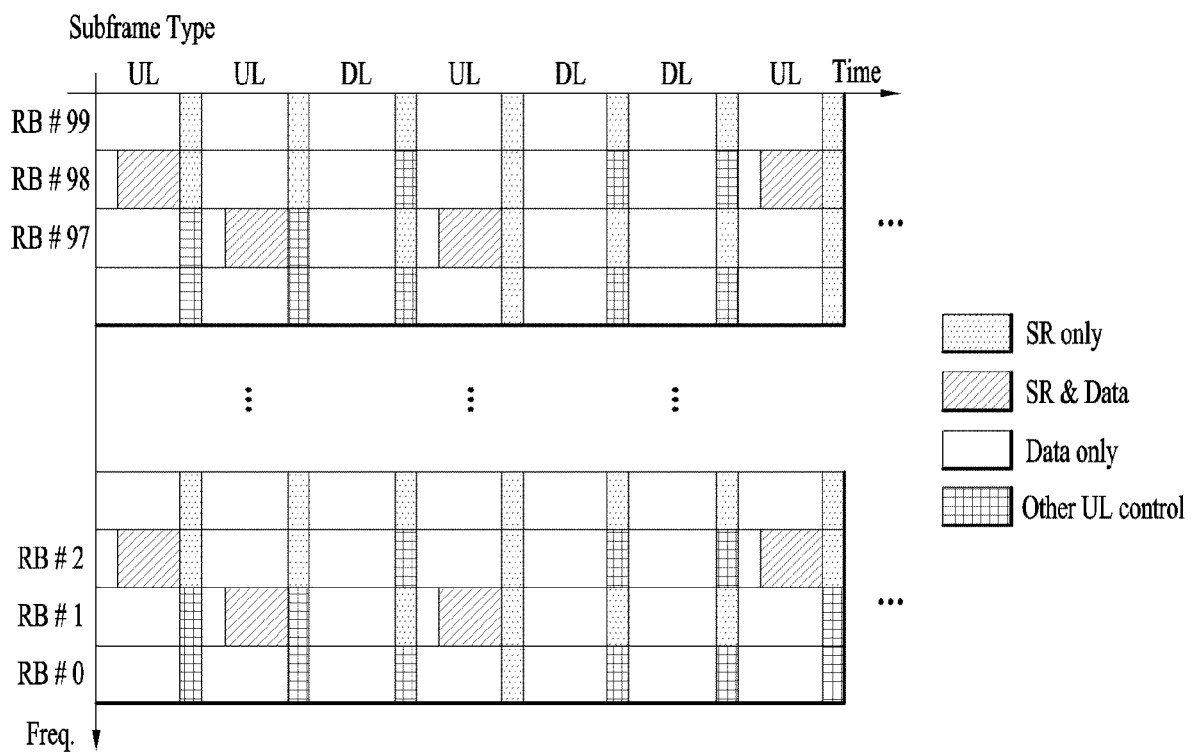
FIG. 13 is a diagram illustrating a pattern of an SR region considering a self-contained subframe.

FIG. 13 is a diagram illustrating a pattern of an SR region considering a self-contained subframe.

The pattern shown in FIG. 13 may be predefined and thus recognized by the UE, or the BS may broadcast the pattern to the UE through common control information. Data transmission of the data group is applicable to contention-based uplink transmission as well as scheduling-based uplink transmission.

The entire procedure associated with FIGS. 12 and 13 is configured as follows.

The BS and the UE pre-agree to the SR Only region, and the SR Only region is UE-specifically allocated in an implicit manner.

The BS and the UE pre-agree to the PoMA-based SR and Data region, in which the SR group is UE-specifically allocated in an implicit manner.

The SR transmission region of the UE may be allocated to the SR Only region and the PoMA-based SR and Data region simultaneously, may be sequentially allocated thereto, or may be allocated to only one of the SR Only region and the PoMA-based SR and Data region. The pattern may be determined according to a predetermined rule such that the UE may recognize the pattern, or the BS may broadcast the pattern to the UEs through common control signaling or pre-announce in the RRC connection stage or periodically announce the pattern to the to the UEs.

The allowed data group in the PoMA-based SR and Data region may be dynamically changed by the SR reliability control mentioned above.

The UE operates as follows.

The UE transmits an SR based on the pre-agreed information described above, and the BS transmits a UL grant to the UE according to scheduling. Then, the UE performs uplink transmission based on the UL grant. Here, the UL grant may designate a Data Only region or an SR and Data region, and may designate both regions simultaneously.

The UE may perform contention-based uplink data transmission in the SR and Data region while transmitting the SR based on the pre-agreed information. In this case, the allowed data group of the SR and Data region may be dynamically changed by the SR reliability control mentioned above. If detection and decoding of the contention-based uplink data transmission are not normally performed, the BS responds to the SR through transmission of a UL grant. In contrast, if detection and decoding of the contention-based uplink data transmission are normally performed, the BS transmits an ACK signal to the UE without responding to the SR.

Alternatively, if detection and decoding of the SR and contention-based uplink data transmission are not normally performed, the BS cannot transmit any information to the UE, and if the UE does not receive a response during a certain threshold, the UE retransmits only the SR or retransmits the SR and the data simultaneously.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method for performing non-orthogonal multiple access scheme-based communication and a device therefor are applicable to various communication systems such as the 3GPP LTE/LTE-A system and the next generation 5G communication system.

The invention claimed is:

1. A method for performing Non-Orthogonal Multiple Access (NOMA)-based communication by a base station, the method comprising:
   determining at least one transmission data resource group based on scheduling request (SR) reception reliability;
   transmitting information about the determined at least one data resource group to a terminal; and
   receiving uplink data from the terminal through a predefined uplink data transmission region in the at least one data resource group,
   wherein the at least one data resource group and an SR resource group including an SR transmission region are allocated to a physical resource region in an overlapping manner, the SR transmission region allowing transmission of an SR therein,
   wherein the predefined uplink data transmission region in the at least one data resource group and the SR transmission region of the SR resource group overlap with each other in the physical resource region.

2. The method of claim 1, wherein the predefined uplink data transmission region in the at least one data resource group is a contention-based data transmission region.

3. The method of claim 1, wherein the information about the determined at least one data resource group is either terminal-group-specific downlink control information or terminal-common downlink control information.

4. The method of claim 1, further comprising:
receiving, from the terminal, the SR through the SR resource group together with the uplink data.

5. The method of claim 1, wherein the SR reception reliability is determined by a detection error rate of the SR in the SR resource group.

6. The method of claim 1, wherein the SR reception reliability is determined by an ACK ratio in the at least one data resource group.

7. The method of claim 1, wherein the number of the at least one data resource group is determined or the at least one data resource group is designated, based on the SR reception reliability.

8. A method for performing Non-Orthogonal Multiple Access (NOMA)-based communication by a terminal, the method comprising:
receiving, from a base station, information about at least one data resource group determined based on scheduling request (SR) reception reliability; and
transmitting uplink data to the base station through a predefined uplink data transmission region in the at least one data resource group,
wherein the at least one data resource group and an SR resource group including an SR transmission region are allocated to a physical resource region in an overlapping manner, the SR transmission region allowing transmission of an SR therein,
wherein the predefined uplink data transmission region in the at least one data resource group and the SR transmission region of the SR resource group overlap with each other in the physical resource region.

9. The method of claim 8, further comprising:
transmitting, to the base station, the SR through the SR resource group together with the uplink data.

10. The method of claim 8, further comprising:
when the at least one data resource group comprises a plurality of data resource groups, selecting a data resource group having higher reception reliability from among the plurality of data resource groups, and transmitting the uplink data through the predefined uplink data region in the selected data resource group.

11. A base station for performing Non-Orthogonal Multiple Access (NOMA)-based communication, the base station comprising:

a processor configured to determine at least one transmission data resource group based on scheduling request (SR) reception reliability;
a transmitter configured to transmit information about the determined at least one data resource group to a terminal; and
a receiver configured to receive uplink data from the terminal through a predefined uplink data transmission region in the at least one data resource group,
wherein the at least one data resource group is allocated to an SR resource group including an SR transmission region and a physical resource region in an overlapping manner, the SR transmission region allowing transmission of an SR therein,
wherein the predefined uplink data transmission region in the at least one data resource group and the SR transmission region of the SR resource group overlap with each other in the physical resource region.

12. The base station of claim 11, wherein the receiver is further configured to receive, from the terminal, the SR through the SR resource group together with the uplink data.

13. The method of claim 11, wherein the processor is configured to determine the number of the at least one data resource group or designate the at least one data resource group, based on the SR reception reliability.

14. A terminal for performing Non-Orthogonal Multiple Access (NOMA)-based communication, the terminal comprising:
a receiver configured to receive, from a base station, information about at least one data resource group determined based on scheduling request (SR) reception reliability; and
a transmitter configured to transmit uplink data to the base station through a predefined uplink data transmission region in the at least one data resource group,
wherein the at least one data resource group is allocated to an SR resource group including an SR transmission region and a physical resource region in an overlapping manner, the SR transmission region allowing transmission of an SR therein,
wherein the predefined uplink data transmission region in the at least one data resource group and the SR transmission region of the SR resource group overlap with each other in the physical resource region.

15. The terminal of claim 14, wherein the transmitter is further configured to transmit the SR through the SR resource group together with the uplink data.

* * * * *